United States Patent [19]

Strayer

[11] 4,104,512
[45] Aug. 1, 1978

[54] COMPUTER CONTROL OF MOVING OBJECTS SUCH AS AIRCRAFT MOVING FROM ONE SECTOR TO ANOTHER

[75] Inventor: Larry G. Strayer, Chatsworth, Calif.

[73] Assignee: Hawaiian Trust Company Ltd., Honolulu, Hi.

[21] Appl. No.: 528,434

[22] Filed: Nov. 29, 1974

[51] Int. Cl.² .................. G06F 15/16; G06F 15/48
[52] U.S. Cl. ................................................. 364/439
[58] Field of Search .............................. 235/150.23

[56] References Cited

U.S. PATENT DOCUMENTS

| | | | |
|---|---|---|---|
| 3,178,704 | 4/1965 | Moore et al. | 235/150.23 X |
| 3,668,403 | 6/1972 | Meilander | 235/150.23 |

Primary Examiner—R. Stephen Dildine, Jr.

[57] ABSTRACT

A method and system of maintaining continuity of computer control and information exchange between moving vehicles such as aircraft and a computer, with a different computer being operative as a given moving vehicle moves from a first defined sector to a second defined sector, the data link between each computer and the moving vehicles located in its sector being provided by radio transmission. Each sector has a different given transmission frequency. A transition area is defined at the interface between the first and second defined sectors wherein the moving vehicle is under joint control of the computers of the successive sectors. Automatically switching control of the moving vehicle from the computer of the first defined sector to the computer of the second defined sector occurs when the moving vehicle leaves the transition area, and a message is transmitted from the computer of the first defined sector to the moving vehicle after completing the switching step informing the latter that control has been switched to the computer of the second defined sector. The moving objects located in each defined sector are polled for information exchange by the computer associated with each defined sector, and a given moving object is removed from the polling list of the first defined sector when the computer of the second defined sector successfully polls the given moving object entering therein.

2 Claims, 4 Drawing Figures

COMPUTER CONTROL OF MOVING OBJECTS SUCH AS AIRCRAFT MOVING FROM ONE SECTOR TO ANOTHER

BACKGROUND OF THE INVENTION

FIELD OF THE INVENTION

The invention relates to the continuity in control of moving objects such as aircraft as they move from one sector to another, in an overall computer controlled system.

DETAILED DESCRIPTION OF THE INVENTION:

The invention concerns generally the continuity in control of craft, such as aircraft, as it moves from one sector to another. The invention is particularly intended to solve problems in an aircraft control system where in each sector tracks the aircraft located therein through use of a computer.

A sector is a geographical region under control of one controller. Aircraft which fly across sector boundaries must be transferred from one control point to another. One problem that arises is to ensure that this transfer (between computes) is done in a manner consistent with requirements for control and conflict prediction.

Theoretically a sector boundary can be thought to describe the separation of
 a. Control responsibility
 b. Communication frequency Obviously, when an aircraft leaves one sector, responsibility must be assumed by another sector. A potential problem arises for conflict prediction (i.e., two planes in different sectors forcing a head-on collision). A solution to this is to define a transition area between all sectors such that all aircraft in the transition area would be redundantly controlled by both sectors. More generally, every aircraft could be controlled by two sectors; one, his resident sector (the one he is currently in), and two, his closest adjacent sector. Control areas, therefore, are not restricted to sector boundaries. This allows transitions through sectors, as well as possible redundancy.

The communication frequency is the radio frequency for computer aircraft communication. Each sector has a different frequency, so that the pilot must switch frequencies whenever he crosses a sector boundary.

An essential point is to keep the switching of frequencies independent of the control responsibility. Frequency adjustment is up to the pilot (at the request from the ground computer) whereas control responsibility must not depend on the pilots' action. This means that a computer may have control responsibility for an aircraft that it can't communicate with, and so positional information must be transmitted from the adjacent sector. The "Handoff" Task coordinates the handoff of an aircraft from its current active sector to the next adjacent sector along its flight path. The handoff may be accomplished either automatically without sector operator interaction or manually directly as a result of sector operator intersection.

Figure 1:
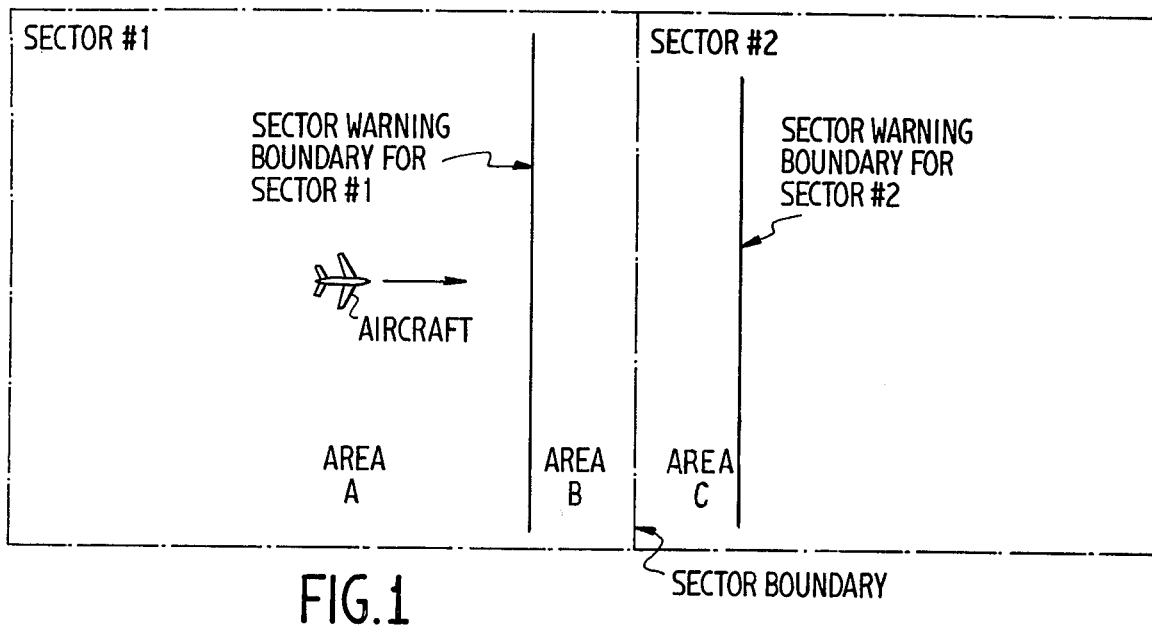
FIG. 1 shows an aircraft flying from one sector to another.

As the aircraft approaches the new sector, it crosses the active sector warning boundary equal to N minutes prior to crossing the sector boundary. From this moment until the aircraft actually crosses the sector boundary, the respective sector operators may elect to manually handoff the aircraft early. When the aircraft crosses the sector boundary, the system will automatically perform the handoff and inform the sector operators of handoff completion. FIG. 1 shows the sector handoff area operation.

Sector #1 is actively controlling aircraft in area A and area B. The aircraft are under active control by displaying the data onto a screen at the location of operator 1. The sector #1 operator can view more than just his active sector. His screen area extends into area C past the sector #2 warning boundary. Sector #2, conversely, can view past the sector #1 warning boundary into area A.

Manual Handoff Sequence

As the aircraft travels across area A and approaches the sector warning boundary and area B, it will simultaneously appear on the sector #2 display. Any time before the aircraft crosses the sector boundary, each sector operator will select the aircraft with his light pen, informing the system that manual handoff is desired. When the system has received indications that both operators have so selected the aircraft for handoff, the system enters the actual hardware handoff.

Figure 2:
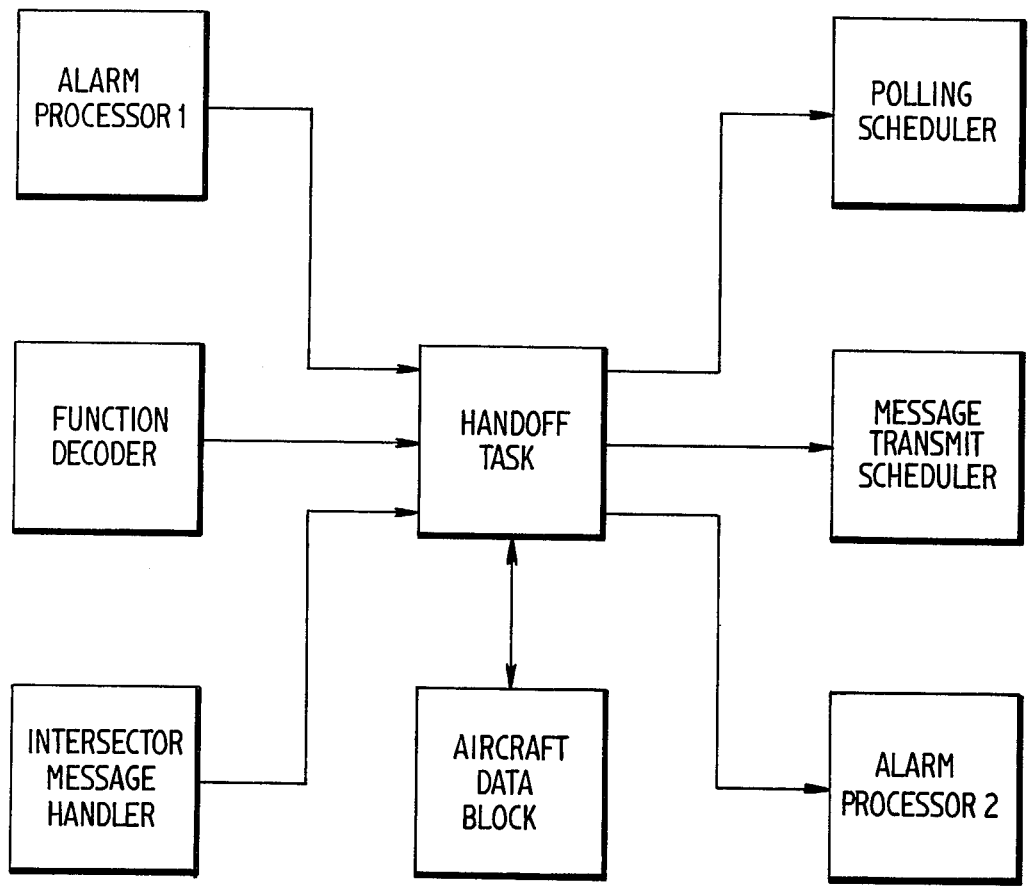
FIG. 2 is a function diagram of the invention.

FIG. 2 is a function diagram of the procedure, which is maintained by the operator in each sector. Sector 1 sends an information message to the aircraft requesting a change of frequency to the new active sector frequency and removes the aircraft from the polling list (explained hereinafter). Sector 2 inserts the aircraft into its polling list and awaits a valid poll response message from the aircraft.

Automatic Handoff Sequence

The automatic handoff sequence is essentially the same as the manual handoff sequence except that either or both of the sector controllers did not elect to select the aircraft for manual handoff. The hardware handoff sequence is automatically entered when the aircraft crosses the active sector boundary between sector 1 and 2 into area C. Sector 1 sends the frequency change information message to the aircraft and removes it from its polling list. Sector 2 enters the aircraft into its polling list and verifies active communication.

Handoff Functions - 1st Sector

The Handoff Task is activated by the alarm processor 1 in response to a sector warning boundary conflict. The Handoff Task immediately determines the destination address of the adjacent sector and posts a "handoff initiate" intersector message to that sector.

The "Handoff Initiate" message from sector 2 is received by the Intersector Message Handler and passed to the Handoff Task. The change frequency message for the pilot is created in a buffer and its address is put into the aircraft data block. The message is transmitted to the aircraft on the next poll. If there is no transmission error, the Handoff Task requests the Polling Scheduler to remove the aircraft from the polling sequence and posts a "Handoff Activate" intersector message for sector 2 to the Message Transmit Scheduler.

When sector 2 polls the aircraft successfully, sector 1 receives a "Handoff Verify" intersector message. The "OVER" alarm is indicated by calling the Alarm Processor 2.

Handoff Functions - 2nd Sector

The Handoff Task is activated by the receipt of a "Handoff Initiate" intersector message passed from the Intersector Message Handler. The alarm Processor is called to insert the necessary data in the aircraft data block to display the aircraft data block on the screen.

When the sector 2 operator light pens the aircraft in handoff status, the function decoder returns the request to the Handoff Task. The Handoff Task calls the alarm processor to post a "Handoff Initiate" intersector message for sector 1 to the Message Transmit Scheduler.

When sector 2 receives the "Handoff Activate" intersector message from the Intersector Message Handler, it calls the polling scheduler to insert the new aircraft identification into its polling list and waits for verification of a valid polling response. The task then posts a "Handoff Verify" intersector message to the Message Transmit Scheduler. The task calls the Alarm Processor to change the "OVER" alarm and sets an internal timer for a period of time, for example, 30 seconds. When the timer expires, the task calls the Alarm Processor to remove the "OVER" alarm entirely.

Figure 3:
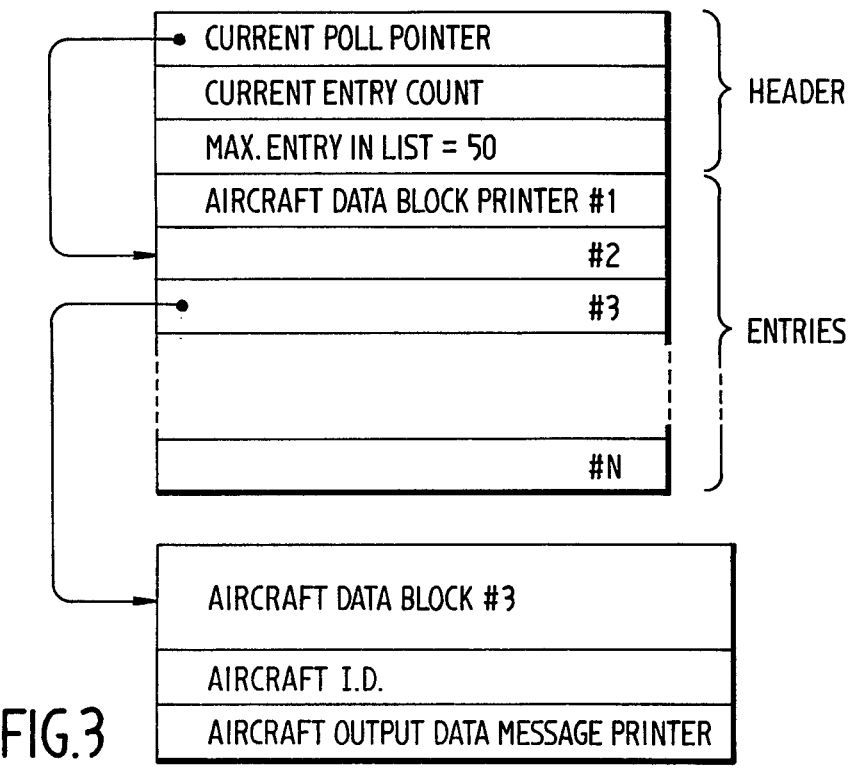
FIG. 3 shows the polling list.

The aircraft in each sector are "polled" for information, such as speed, direction, etc., by the computer corresponding thereto. The polling scheduler task inserts and deletes aircraft entries from the polling list and as aircraft enter and leave each sector, maintains a cyclic pointer to the current aircraft being polled. A function diagram of the procedure is shown in FIG. 3.

Figure 4:
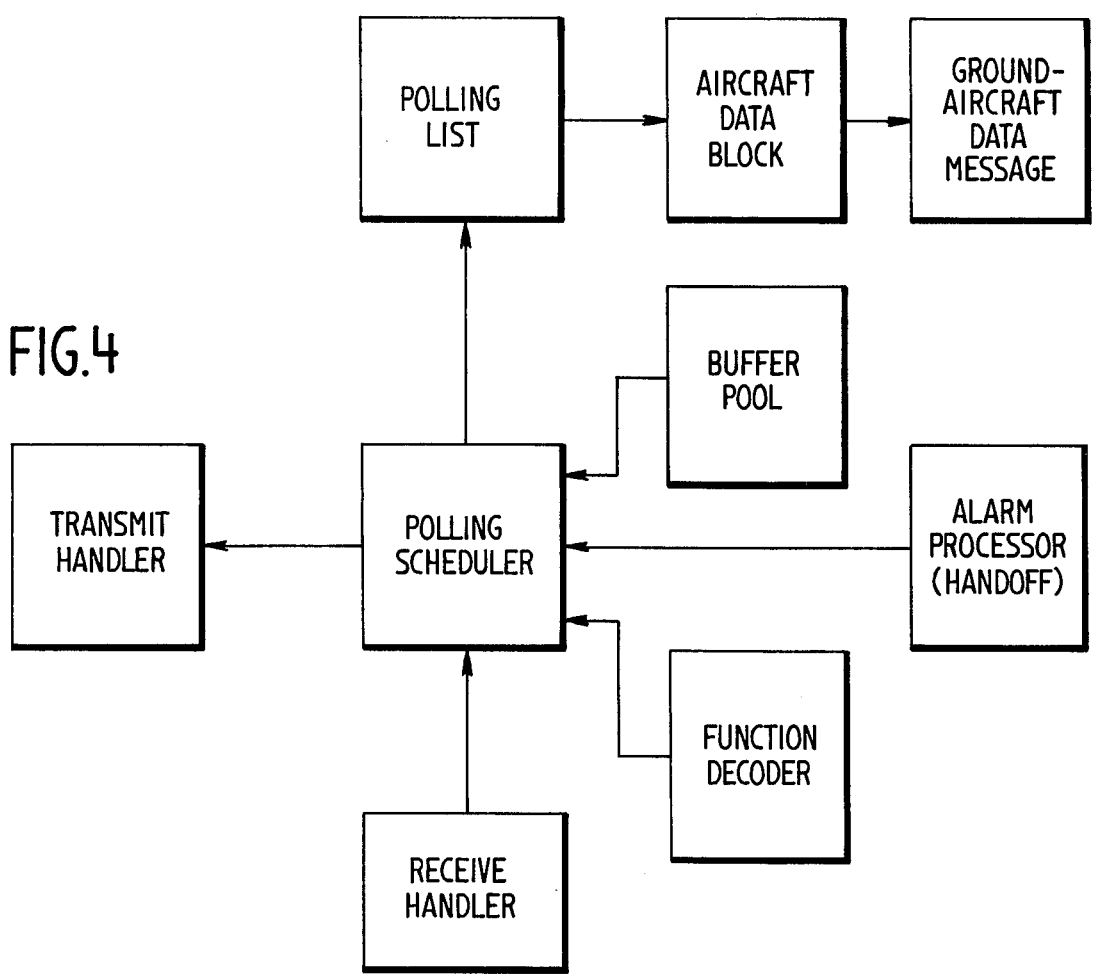
FIG. 4 is a block diagram of the polling scheduler.

Aircraft are entered into the polling list (FIG. 4) when they pass from another sector's control area into the sector monitored by this system. Each system contains aircraft data blocks for aircraft adjacent to but not yet a member of this sector's air space. The data for these "control" aircraft arrives via telephone communication lines from the sector actively polling the aircraft.

As the aircraft crosses the sector boundary into the system's active area; the two systems execute a HANDOFF procedure, the pilot changes his transceived frequency, a new aircraft identification is defined (or not), the handoff system deletes the aircraft from its polling list, and the accepting system adds the aircraft to its polling list. An aircraft is added to the polling list by inserting a pointer to that aircraft's data block into the next available list location and incrementing the current entry count. The insert request is rejected if the list is already full. The polling list size is large enough to accept all aircraft in the "control" area in the event of surrounding sector malfunction.

Aircraft are deleted from the polling list (FIG. 3) when the aircraft is handed over to the next sector, his flight path crosses or when the aircraft terminates his flight within the sector. Aircraft may be deleted from the active polling list but still remain within the "control" area monitored by the system. A polling list entry is deleted by beginning with the first entry in the list and using the pointer to find the aircraft data block of the aircraft to be deleted. An aircraft may be identified by either name or identification. If the name or identification is not the same as the aircraft to be deleted, the next entry is checked. When the correct entry is found, all the remaining entries are moved one location up on the list and the current entry count is decremented.

The polling scheduler (see function block diagram, FIG. 4) monitors its own activity. An empty list forces the polling scheduler into an inactive status. The first call from the HANDOFF routine inserts a polling entry, puts the polling scheduler into an active status, and starts the polling sequence by flagging a pending transmission request. If the polling scheduler is already active the HANDOFF routine request only adds another entry and the next transmission is controlled by a call from the Receive Handler.

A pending transmission may be inhibited by manual command from the sector controller. The command decoder passes the polling inhibit request to the polling scheduler. The polling scheduler sets an internal inhibit flag, and all future polling requests are ignored until the poll inhibit flag is reset by another manual command. The polling list also has a minimum cycle time initially set to 1 second, for example. If the entire list is polled in less than 1 second, the polling scheduler waits for the full 1 second before beginning again at the head of the list.

When it is time to service a pending transmission request, the polling scheduler calls the buffer pool to get an empty receive buffer which is to be fulled with the next poll response from the polled aircraft: then the next entry is selected by incrementing the current entry pointer. If the pointer is beyond the end of the boiling list as defined by the current entry count it is reset to the beginning of the list. If the polling delay has expired, the aircraft data block pointer is passed to the Transmit Handler for transmission.

The aircraft data block contains the aircraft and the address of the ground to aircraft data message if one is present. Data messages are queued one at a time and a new message is not posted until the last message is acknowledged by an appropriate poll response from the aircraft.

Prompted by the polling message, the aircraft with the correct identification will transmit the polling response. After the Receive Handler receives the complete poll response message or a timeout, it will call the polling scheduler to initiate another poll transmission.

The invention is intended for use in an overall system wherein radio transmission is used between aircraft and the controllers located in the various sectors, with information exchange and aircraft control being computerized. This type of system is described in application Ser. No. 109,133, filed Jan. 25, 1971, now abandoned, and assigned to the owner of the invention described herein.

I claim:

1. A method of maintaining continuity of computer control and information exchange between moving vehicles and a computer, with a different computer being operative as a given moving vehicle moves from a first defined sector to a second defined sector, the data link between each computer and the moving vehicles located in its sector being provided by radio transmission, each sector having a different given transmission frequency comprising:

defining a transition area at the interface between the first and second defined sectors wherein the moving vehicle is under joint control of the computers of the successive sectors, automatically switching control of the moving vehicle from the computer of the first defined sector to the computer of the second defined sector when the moving vehicle leaves the transition area, transmitting a message from the computer of the first defined sector to the moving vehicle after completing the switching step informing the latter that control has been switched to the computer of the second defined sector.

polling the moving objects located in each defined sector for information exchange by the computer associated with each defined sector, and removing a given moving object from the polling list of the first defined sector when the computer of the second defined sector successfully polls the given moving object entering therein.

2. A method of maintaining continuity of computer control and information exchange between aircraft and a computer, with a different computer being operative as a given aircraft moves from a first defined sector to a second defined sector, the data link between each computer and the aircraft located in its sector being provided by radio transmission, each sector having a different given transmission frequency, comprising:

defining a transition area at the interface between the first and second defined sectors wherein the aircraft is under joint control of the computers of the successive sectors, automatically switching control of the aircraft from the computer of the first defined sector to the computer of the second defined sector when the aircraft leaves the transition area, transmitting a message from the computer of the first defined sector to the aircraft after completing the switching step informing the latter that control has been switched to the computer of the second defined sector, polling the aircraft located in each defined sector for information exchange by the computer associated with each defined sector, and removing a given aircraft from the polling list of the first defined sector when the computer of the second defined sector successfully polls the given aircraft entering therein.

* * * * *

UNITED STATES PATENT OFFICE
CERTIFICATE OF CORRECTION

Patent No. 4,104,512         Dated August 1, 1978

Inventor(s) Larry G. Strayer

It is certified that error appears in the above-identified patent and that said Letters Patent are hereby corrected as shown below:

Column 1, line 31, "computes" should read -- computers --.

Signed and Sealed this

Sixth Day of March 1979

[SEAL]

Attest:

RUTH C. MASON
*Attesting Officer*

DONALD W. BANNER
*Commissioner of Patents and Trademarks*